US009038947B2

(12) United States Patent
Huber et al.

(10) Patent No.: US 9,038,947 B2
(45) Date of Patent: May 26, 2015

(54) FLOOR FOR AN AIRCRAFT CARGO COMPARTMENT AND METHOD FOR THE ASSEMBLY THEREOF

(75) Inventors: Thomas Huber, Schliersee (DE); Andreas Patzlsperger, Waakirchen (DE); Richard Holzner, Rosenheim (DE)

(73) Assignee: Telair International GmbH (DE)

( * ) Notice: Subject to any disclaimer, the term of this patent is extended or adjusted under 35 U.S.C. 154(b) by 287 days.

(21) Appl. No.: 13/346,394

(22) Filed: Jan. 9, 2012

(65) Prior Publication Data

US 2012/0126057 A1 May 24, 2012

Related U.S. Application Data

(62) Division of application No. 10/564,827, filed as application No. PCT/EP2004/007922 on Jul. 15, 2004, now Pat. No. 8,157,210.

(30) Foreign Application Priority Data

| Jul. 18, 2003 | (DE) | .................................. 103 32 798 |
| Aug. 27, 2003 | (DE) | .................................. 103 39 507 |
| Aug. 27, 2003 | (DE) | .................................. 103 39 508 |
| Mar. 8, 2004 | (DE) | .......................... 10 2004 011 163 |
| Mar. 8, 2004 | (DE) | .......................... 10 2004 011 164 |

(51) Int. Cl.
| *B64C 1/18* | (2006.01) |
| *B64C 1/20* | (2006.01) |
| *B64C 1/06* | (2006.01) |
| *B64C 1/22* | (2006.01) |

(Continued)

(52) U.S. Cl.
CPC . *B64C 1/068* (2013.01); *B64C 1/18* (2013.01); *Y10T 29/49826* (2015.01); *B64C 1/061* (2013.01); *B64C 1/064* (2013.01); *B64C 1/065* (2013.01); *B64C 1/20* (2013.01); *B64C 1/22* (2013.01); *B64D 9/00* (2013.01); *B64D 11/02* (2013.01); *B64D 2011/0046* (2013.01)

(58) Field of Classification Search
CPC .............. B64C 1/22; B64C 1/20; B64C 1/18; B64C 1/069; B64C 1/068; B64D 2001/0046
USPC .................................. 244/118.1, 118.2, 118.3
See application file for complete search history.

(56) References Cited

U.S. PATENT DOCUMENTS 2,412,778 A * 12/1946 Kosek ........................... 244/120
2,689,696 A * 9/1954 Gannon ..................... 244/118.1

(Continued)

FOREIGN PATENT DOCUMENTS

| DE | 2162042 A | 7/1972 |
| DE | 19712278 A1 | 3/1997 |

(Continued)

*Primary Examiner* — Tien Dinh
*Assistant Examiner* — Richard R Green
(74) *Attorney, Agent, or Firm* — Barnes & Thornburg LLP

(57) ABSTRACT

In conventional aircraft cargo compartments panels or similar flat floor elements are fastened to floor beams or similar supporting elements that are installed in the body of the aircraft. Subsequently functional units such as roller elements, latches or PDUs are mounted and connected to one another by way of appropriate control conductors. It is proposed to fasten the floor elements permanently to the supporting beams so as to form prefabricated floor modules and to install these floor modules in the aircraft.

8 Claims, 5 Drawing Sheets

(51) Int. Cl.
  *B64D 9/00*   (2006.01)
  *B64D 11/02*  (2006.01)
  *B64D 11/00*  (2006.01)

(56) References Cited

U.S. PATENT DOCUMENTS

| | | | |
|---|---|---|---|
| 3,026,071 A * | 3/1962 | Barcellona et al. | 244/137.1 |
| 3,381,921 A | 5/1968 | McDonough et al. | |
| 3,578,274 A * | 5/1971 | Ginn et al. | 244/118.6 |
| 3,612,316 A | 10/1971 | Baldwin et al. | |
| 4,479,621 A * | 10/1984 | Bergholz | 244/117 R |
| 4,629,379 A | 12/1986 | Harris et al. | |
| 4,807,735 A | 2/1989 | Huber | |
| 4,989,809 A * | 2/1991 | Arnold | 244/137.1 |
| 5,540,402 A | 7/1996 | Carducci | |
| 5,806,797 A * | 9/1998 | Micale | 244/120 |
| 5,827,022 A * | 10/1998 | Tovani | 410/78 |
| 5,927,650 A * | 7/1999 | Huber | 244/118.1 |
| 5,975,464 A | 11/1999 | Rutan | |
| 6,061,982 A * | 5/2000 | Owen | 52/220.1 |
| 6,125,984 A | 10/2000 | Huber et al. | |
| 6,126,113 A | 10/2000 | Nivickass | |
| 6,517,028 B2 | 2/2003 | Huber | |
| 6,557,800 B2 * | 5/2003 | Medina et al. | 244/118.1 |
| 6,824,851 B1 | 11/2004 | Locher et al. | |
| 7,410,128 B2 * | 8/2008 | Nordstrom | 244/137.1 |
| 2002/0148928 A1 * | 10/2002 | Oki | 244/118.1 |
| 2004/0237439 A1 | 12/2004 | Powell | |

FOREIGN PATENT DOCUMENTS

| | | |
|---|---|---|
| DE | 19720224 A1 | 5/1997 |
| DE | 20122116 U1 | 6/2004 |
| EP | 0649802 A1 | 4/1995 |
| EP | 0681956 A1 | 11/1995 |
| GB | 2326863 A1 | 1/1999 |

* cited by examiner

FLOOR FOR AN AIRCRAFT CARGO COMPARTMENT AND METHOD FOR THE ASSEMBLY THEREOF

CROSS-REFERENCE TO RELATED APPLICATIONS

This is a divisional application of application U.S. patent application Ser. No. 10/564,827 filed May 22, 2006 now U.S. Pat. No. 8,157,210, which is a National Stage application for Patent Cooperation Treaty (PCT) Application No. PCT/EP2004/007922 filed Jul. 15, 2004 entitled, "FLOOR FOR AN AIRCRAFT CARGO COMPARTMENT AND A METHOD FOR THE ASSEMBLY THEREOF," which claims priority to: German Patent Application No. 103 32 798.3, filed Jul. 18, 2003; German Patent Application 103 39 507.5, filed Aug. 27, 2003; German Patent Application No. 103 39 508.3, filed Aug. 27, 2003; German Patent Application No. 10 2004 011 163.4, filed Mar. 8, 2004; and German Patent Application No. 10 2004 011 164.2, filed Mar. 8, 2004; all of the above disclosures are herein incorporated by reference in their entirety.

FIELD OF THE INVENTION

The invention relates to a floor for an aircraft cargo compartment as well as to a method of assembling said floor.

BACKGROUND OF THE INVENTION

From the documents DE 19627846A1 (U.S. Pat. No. 5,927,650), DE 19720224A1 (U.S. Pat. No. 6,125,984), EP 0649802A1, U.S. Pat. No. 4,807,735 or U.S. Pat. No. 3,612,316 floors for aircraft cargo compartments are known in which panels or similar flat floor elements are provided for the fixation of roller elements, ball elements, latches, PDUs or similar functional units; these panels are mounted on a flat floor of an aircraft or on floor beams or similar supporting elements that support the panels and are themselves connected to a body or skin of the aircraft. In order to assemble the known cargo-compartment floors, initially the body or skin of the aircraft, i.e. the fuselage, is constructed together with the supporting elements, and subsequently the floor elements are mounted on the supporting elements in the aircraft cargo compartment. As a final step the functional units are installed and connecting leads (control lines, hydraulic conduits, drainage conduits etc.) are attached. This involves a major expenditure of effort, in that the assembly work is very intricate and furthermore must be carried out within the restricted space of the cargo compartment. Because of this complicated procedure and the limited possibilities for manipulation during the work, there is the added problem that errors can easily be made.

BRIEF SUMMARY OF THE INVENTION

It is the objective of the invention to disclose a cargo-compartment floor as well as a method for its assembly in which the work is facilitated and a reduction of the possibilities for errors during assembly is ensured.

This objective is achieved, in the case of a floor for an aircraft cargo space that comprises panels or similar flat floor elements to which are attached roller elements, ball elements, latch elements, PDUs or similar functional units, as well as floor beams or similar supporting elements to support the floor elements and to be connected to a body or a skin of the aircraft, in that the floor elements are fixedly connected to the supporting elements so as to form prefabricated floor modules and the floor modules can be installed in the aircraft.

Regarding the method, the objective is achieved by a method for assembling an aircraft cargo-compartment floor that comprises the following steps:

The panels, or similar flat floor elements for the fixation of roller elements, ball elements, latch elements, PDUs or similar functional units, are attached to floor beams or similar supporting elements that support the floor elements and are to be connected to a body or skin of the aircraft, so that the panels together with the supporting elements constitute prefabricated floor modules that can be manipulated as a unit, A floor module is lifted into the cargo compartment, and The supporting elements are fastened to the body or skin of the aircraft.

Hence an essential point of the invention resides in the fact that the supporting elements, in particular floor beams, are no longer considered as parts of the aircraft fuselage to which the floor elements are to be fastened while inside the aircraft. Instead, the supporting elements or floor beams are considered to be elements of the cargo-compartment floor, which together with the floor elements form floor modules and which then, as a whole, can be installed in the aircraft or cargo compartment in the prefabricated state. In this way the installation is not only made very much simpler, but also the floor modules can be set up outside the constricting cargo compartment, where they are readily accessible, and assembled to the desired level of construction, so that errors can be avoided and in many cases it is even possible to employ completely different assembly methods (e.g., automated and performed by robots) that could not be used inside the cargo space. Furthermore, sites below the floor elements are made accessible that could not be reached at all in the case of cargo-compartment floors constructed in the conventional manner or with conventional assembly methods.

Preferably the functional units are mounted on the floor element of the floor modules, so that a subsequent mounting inside the cargo compartment is no longer necessary. In particular electrical and/or mechanical control devices are provided, e.g. data-bus devices to control the functional units, in particular the PDUs, and are connected to the functional units, which is particularly simple to achieve outside the cargo compartment because accessibility from below is guaranteed at all times.

Preferably transmission sockets or similar transmission connecting devices are provided and attached to the floor modules in such a way that they can be connected to correspondingly shaped transmission devices on an adjacent floor module. Thus each floor module constitutes a self-contained functional unit, which after it has been lifted into the cargo compartment can be connected or coupled to the floor module already present there.

Preferably sections of cable channels, hydraulic conduits, water conduits, electrical leads or similar types of conductors are provided in the floor modules so that, together with conductors of the same kind that are provided in adjacent floor modules, they form overall conduction systems once the floor modules have been installed in the aircraft. In this way the floor modules simultaneously also constitute sections of the conduction devices, in which branches are provided to enable any desired connections to prespecified parts of the panels and/or the functional units. As a result, the construction of conduction systems is made considerably easier. As a whole, therefore, the floor modules should not only contain the complete cabling and drainage etc. for the organs of the cargo-loading system, but are preferably intended to comprise all the "ducting" needed for the entire aircraft—e.g., conduits for the air-conditioning system or other cable arrangements that are normally arranged separately so as to pass through this region of the aircraft. This achieves a considerably more efficient operation during construction of the aircraft as a whole.

Preferably the floor elements are provided with assembly elements to enable a mechanically stable connection to adjacent floor elements during or after installation in the aircraft. This measure makes it possible to connect the floor elements so as to form a firm, stable and rigid surface, which endows the entire aircraft with increased stability and considerably reinforces the cargo-compartment floor.

Preferably there are provided in the floor elements inspection or installation openings, by way of which a bilge space below the floor elements is accessible. To close these openings special floor-element sections are provided. As a result it is possible to carry out assembly work within the bilge space even after installation. The floor-element sections for closing the openings are preferably fixed to the floor elements by means of quick-acting closures, so that they can be opened very easily and rapidly.

The floor elements preferably comprise sealing means for sealing off a space above the floor elements against a space (e.g., the bilge space) below the floor elements. This sealing is intended on one hand for the containment of fluids such as water that may be carried into the cargo compartment as the containers are being loaded, and on the other hand to prevent leakage of gases such as are used to extinguish fires, so that the cargo compartment (in some cases also the bilge space) can be filled with an inert gas in order to put a fire out. These sealing means are especially simple to apply (e.g., in the form of a sprayed-on coating), because the floor modules are assembled outside the cargo space and hence are accessible from below.

Preferably leakproof connecting elements are provided, to create a sealed connection between a floor element and adjacent floor elements and/or the skin of the aircraft. These connecting elements are in particular so constructed that after installation of a floor module, the floor element in this module is tightly sealed to the adjacent floor element as well as the cargo compartment, so that there is no need for a separate, subsequent sealing process.

Preferably drainage devices are provided to carry fluids away from the cargo compartment (the water that is brought in as described above) and to transfer the fluid into corresponding drainage devices in neighboring floor modules, so that a separate installation of conduits for removing water is not required.

Preferably the floor modules in addition comprise floor panels or similar surfaces on which it is convenient to walk, so that each floor module constitutes a complete section of a cargo-compartment floor.

The floor modules are additionally provided with insulation devices for insulation from a lower half of the fuselage. As a result, the insulation (which is always necessary) need not be added at a later stage, but can be fitted to the modules while they are still outside the aircraft. These insulation devices can be attached either under the floor elements, which is especially simple to accomplish outside the aircraft, or alternatively (in some cases additionally) in the region of the supporting elements, where they will be near the aircraft's skin, if desired. Hence there is no need to work in the constricted region of the aircraft that is below the cargo-compartment floor.

The floor modules can also be constructed so as to comprise bulkheads or similar partitions, or alternatively fixation devices with which to attach partitions such as are ordinarily attached after installation in certain parts of the cargo compartment. The floor module designed in accordance with the invention, however, is very much simpler to install. The partitions preferably consist at least partially of ballistically resistant material, so that a high degree of reliability is ensured.

The floor modules can additionally comprise devices for mounting electronic equipment (EE racks) and similar components, or fixation devices for such components. This again offers the advantage that extremely simple construction is possible outside the aircraft, and is both economical and efficient.

The floor modules further comprise water and/or wastewater tanks or devices for fixing such tanks in position, as well as devices for connecting pipelines, so that the floor modules simultaneously represent "water-supply—modules". Where appropriate, it is also possible to provide supplementary fuel tanks on the floor modules, including the necessary pipeline connections; in this case exchangeable units are especially advantageous, so that aircraft can be equipped with larger or smaller supplementary tanks (or none at all), as required.

The floor modules are also provided with coverings for walls and/or ceilings or similar covering elements, or devices for installing such coverings, in order to provide the cargo compartment with a lining. Then the floor modules amount to compact "cells" of which the cargo compartment is composed, which can be pushed into the aircraft fuselage. The floor modules are preferably constructed and fixed to the skin of the aircraft in such a way that after installation in the aircraft, they can be taken out again in any arbitrary sequence. This makes maintenance and/or repair of the cargo-compartment floor considerably easier.

In order to assemble a floor for the cargo-compartment of an aircraft, the following steps are carried out:

First the flat floor elements are fixedly connected to the supporting elements. Then the floor modules thus produced are lifted into the cargo compartment. Finally the supporting elements are attached to the body or the skin of the aircraft. The functional units are preferably fixed to the floor elements before the latter are lifted into the cargo compartment, which can be done considerably more easily than installing them when inside the aircraft.

After the floor modules have been lifted in, the control devices for controlling the functional units—cable channels, hydraulic conduits, water conduits, electrical leads or similar conducting devices, as well as drainage devices for removing fluids from the cargo compartment, if present—are connected to the respective counterparts (control devices, conducting devices etc.) associated with an adjacent floor module that has already been fixed in position within the cargo compartment. This kind of procedure also makes it possible to test parts of the "growing" overall system, which considerably facilitates the localization of any defects that may be present. In particular, at least parts of the said connection steps take place before the supporting elements are attached to the body or skin of the aircraft, so that if mistakes occur during connection and/or defects are discovered within a module, the module can be lifted back out of the cargo compartment and replaced by another, correctly constructed module.

Preferred embodiments will be apparent from the subordinate claims as well as the following description of an exemplary embodiment of the invention, which is explained in detail with reference to figures, wherein

DETAILED DESCRIPTION OF THE INVENTION

Figure 1:
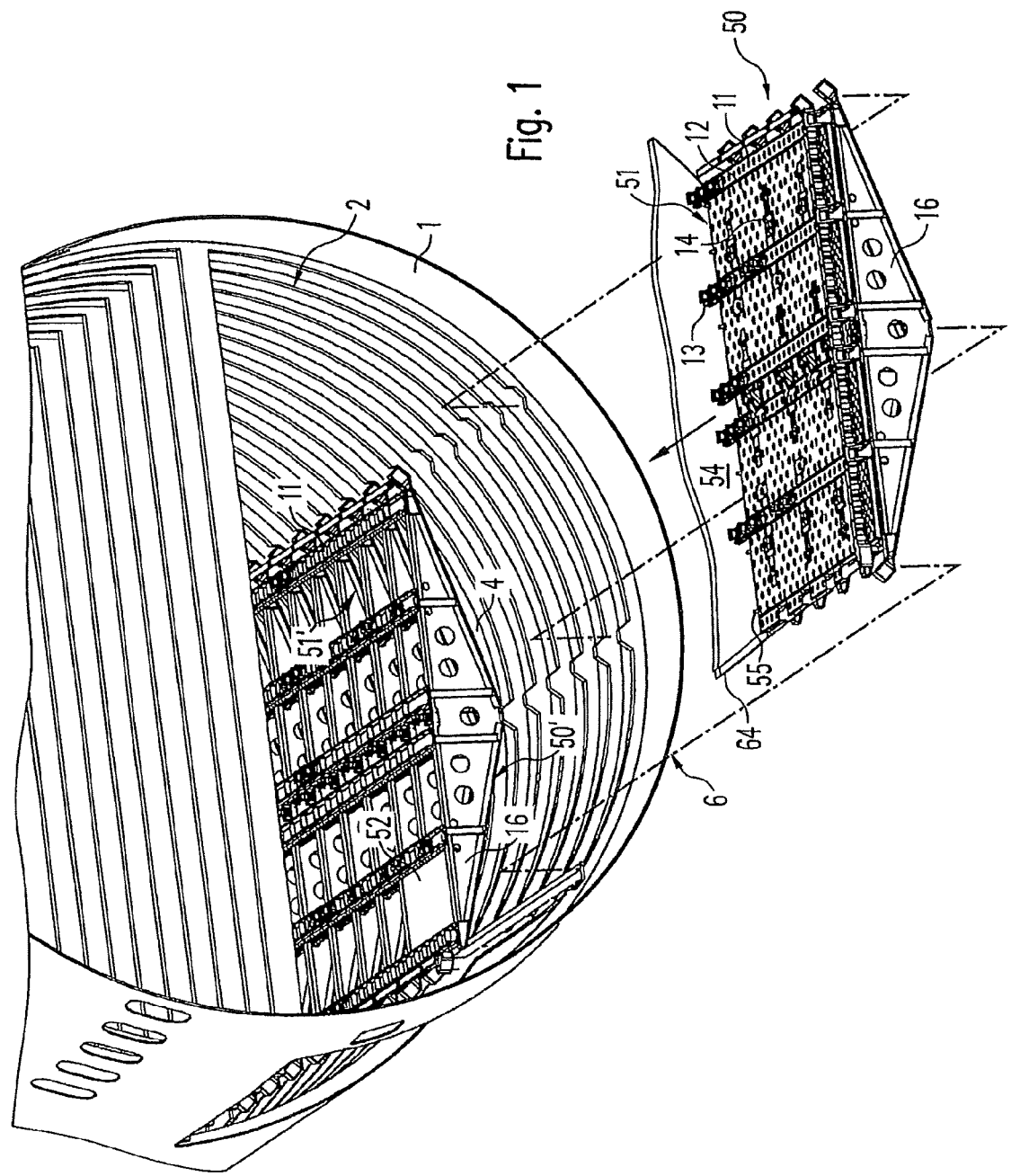
FIG. 1 is a perspective drawing of part of a floor module prior to installation.

In the following description, the same reference numerals are used for identical parts or parts with identical actions.

As shown in FIG. 1, a body or an (outer) skin 1 of an aircraft encloses in the lower half 6 of the fuselage a cargo compartment 2, in which floor elements 51 form a cargo-compartment floor, below which is a bilge space 4. The floor elements 51 are fixed to supporting elements, so-called floor beams 16, which in turn are fixed to the skin 1 of the aircraft.

On or at the floor elements 51 there are attached surfaces on which to walk, called floorboards, as well as functional units for transporting and securing loads, namely roller elements 11, ball elements 12, latches 13 and roller-drive units, so-called PDUs 14, as is known from the printed documents cited at the outset.

The floor elements 51 for producing the cargo-compartment floor are attached to the floor beams 16 while outside the aircraft, so as to produce floor modules 50 that will occupy either part of the width, or preferably the entire width of the final cargo-compartment floor.

Also mounted on the floor modules 50 are the partitions 54 that will be needed in the cargo compartment; the fixation devices 55 provided for this purpose can also be constructed so that installation and/or removal of the partitions 54 can be done inside the aircraft. The partitions 54, as indicated in FIG. 1, are provided with sealing devices 64 so that after they have been installed, the seating of the partitions 54 in the cargo compartment 2 is sufficiently gas-tight that the compartment can be filled with halon in order to extinguish fires.

Figure 3:
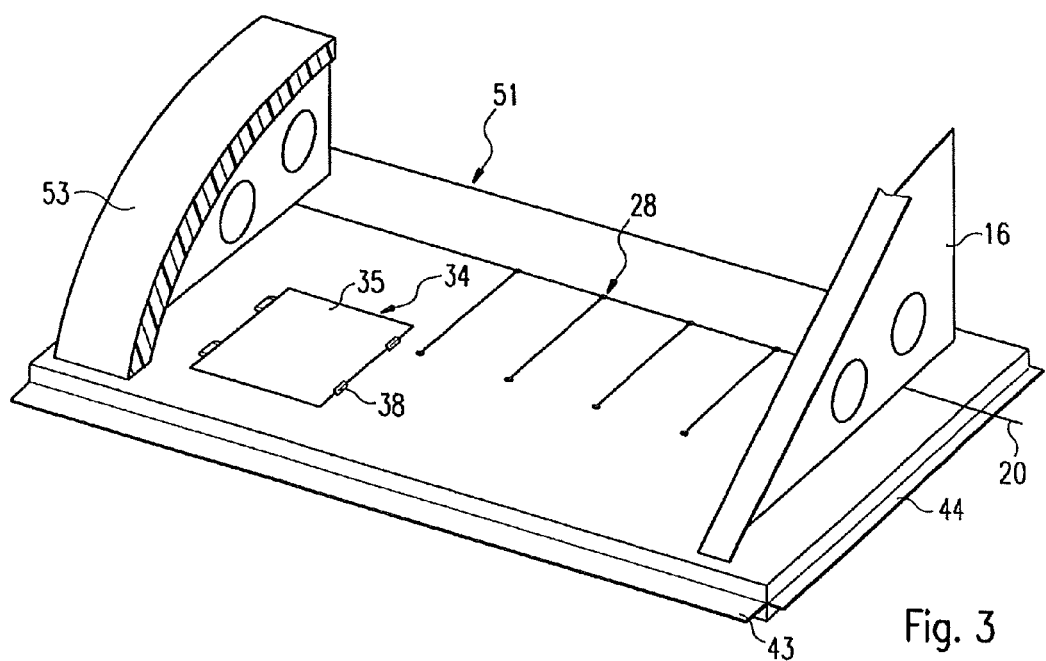
FIG. 3 is a schematic perspective drawing of a floor module as viewed from below.

As can be seen in FIG. 3, when assembly occurs outside the aircraft the floor elements 51, which are attached to the floor beams 16 (or conversely), are provided with control devices 20 that by way of branches 28 are connected to functional elements mounted on a floor element 51, in particular PDUs 14, so as to control the function of the functional elements.

The floor elements 51 further comprise inspection openings 34 that can be closed by means of floor-element sections that form flaps 35. To close them fast-acting closures 38 are provided.

The floor elements 51 are additionally equipped with leakproof connecting elements 43 and 44, e.g. sealing lips made of elastomer, so that a tight seal is ensured on one hand against the skin 1 of the aircraft (by means of the leakproof connecting elements 43) and on the other hand against the floor elements 51' (see FIG. 1) that will occupy adjacent positions after installation.

In addition—as indicated in FIG. 3—insulators 53 are disposed on the modules 50 in such a way that they are in relatively close contact with the outer skin 1 when the modules 50 have been installed. In addition (or alternatively) corresponding insulation devices can also be mounted below the floor elements 51, or an insulating coating can be sprayed onto their lower surfaces, so that the cargo compartment is thermally isolated from the outer skin.

Figure 4:
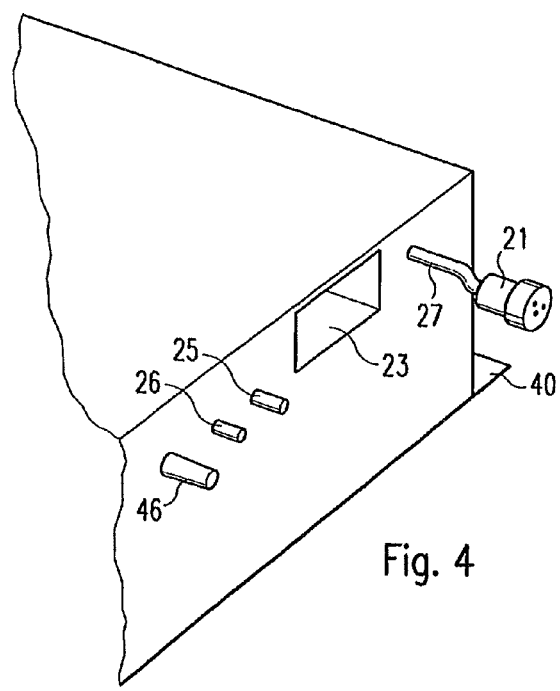
FIG. 4 is a partial perspective drawing of a detail of a floor element.

As can be seen in FIG. 4, the floor elements 51 and/or floor modules 50 are also provided with electrical leads 27, which by way of transmission sockets 21 can be connected to corresponding leads of adjacent floor elements 51' and/or floor modules 50', so as to form continuous strands.

In addition, cable channels 23, hydraulic conduits 25, water conduits 26 and electrical leads 27 are provided so that various operations customarily required in aircraft can be accomplished. Here, again, it is preferable for transmission sockets or similar connecting elements to be provided so that these conducting channels can be connected to their counterparts in adjacent floor modules 50'. The same applies to the drainage conduits 46, which are known per se and serve to carry away water that penetrates into the cargo compartment or is carried in along with the cargo. It should be emphasized at this point that the conduits, channels and similar conducting means that are installed in the modules can be employed not only to assist the functions of the elements installed in the cargo compartment, but can also incorporate the entire "infrastructure" of the aircraft, i.e. other systems that are normally housed in this region of the aircraft.

The floor elements 51 are preferably sealed on their undersurface, by means of sprayed-on coatings, films or similar sealing devices 40, so as to produce a preferably gas-tight seal between the upper surface and the lower surface of the floor elements 51, so that fire-extinguishing gas introduced to the cargo compartment 2 cannot escape through the bilge space 4. The floor modules 50 are thus substantially pre-assembled, so that after this pre-assembly it is even possible (while they are still outside the aircraft) to conduct trials intended, e.g., to test in individual sections whether the conduits are correctly connected and the functional elements, in particular the PDUs, are functioning properly. It is also possible to incorporate into the modules electronic control components that are "responsible" for the controllable functional elements, in particular the PDUs. This facilitates the construction and also the test procedures outside the cargo compartment.

Figure 2:
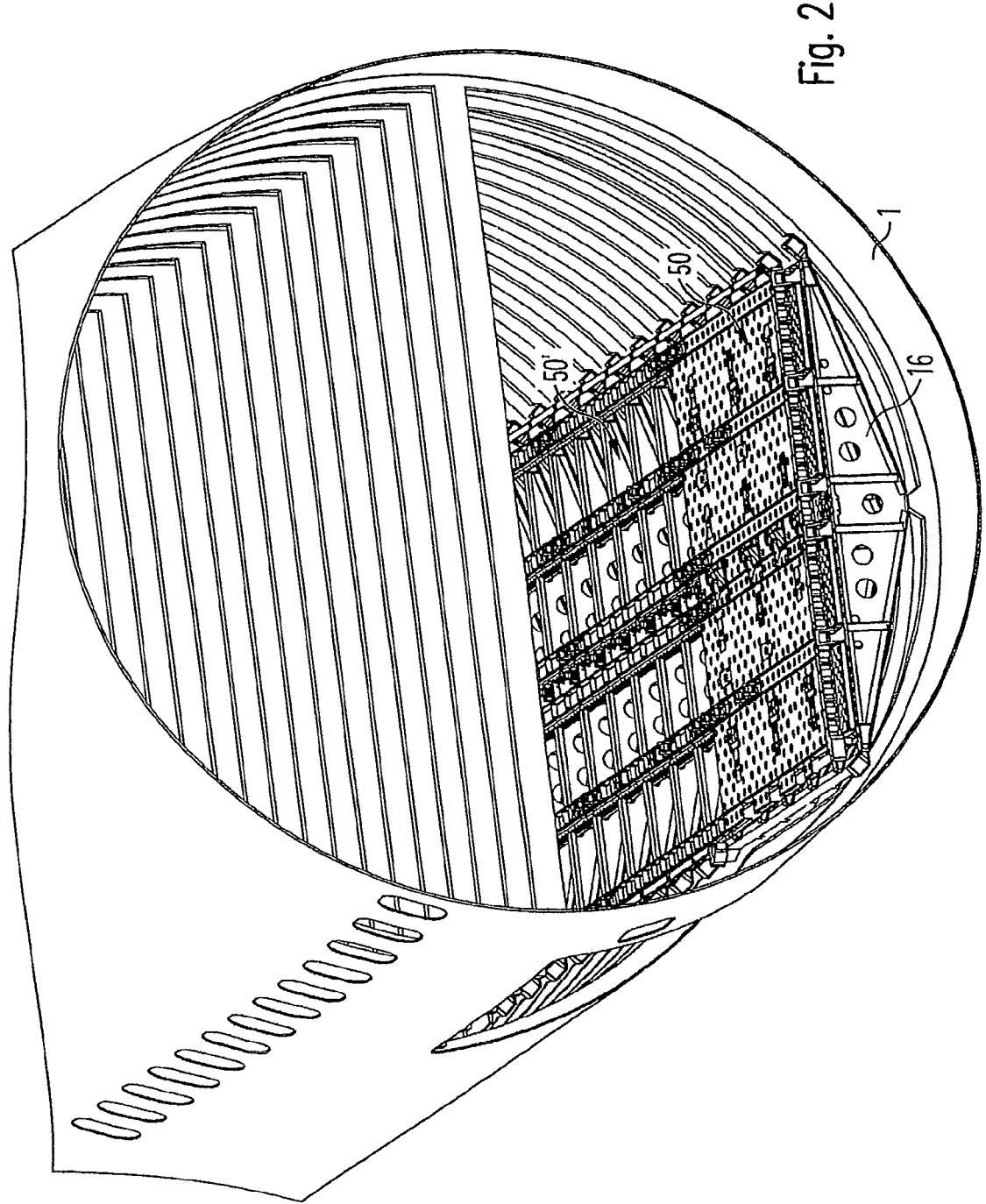
FIG. 2 is a drawing similar to that in FIG. 1 but with the floor module installed.

The floor modules 50 thus previously assembled are then, as shown in FIG. 2, set into the aircraft and connected by way of the floor beams 16 to the body 1 of the aircraft. In this way the entire cargo-compartment floor is produced, one section after another.

It is of course also possible to operate in smaller or larger structural units, depending on how large the units are and how easy or difficult it is to handle them. Preferably, however, modules 50 are provided that constitute a complete floor in the direction across the cargo space, so that the floor beams 16 can be constructed as a single piece and hence are extremely stable.

Figure 5:
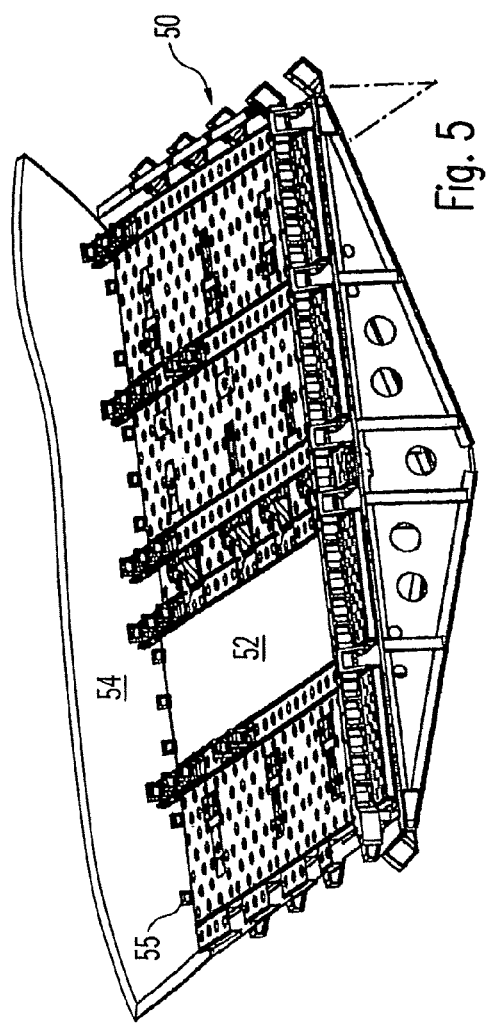
FIG. 5 shows another embodiment of a floor module with partition and surface on which to walk
Figure 6:
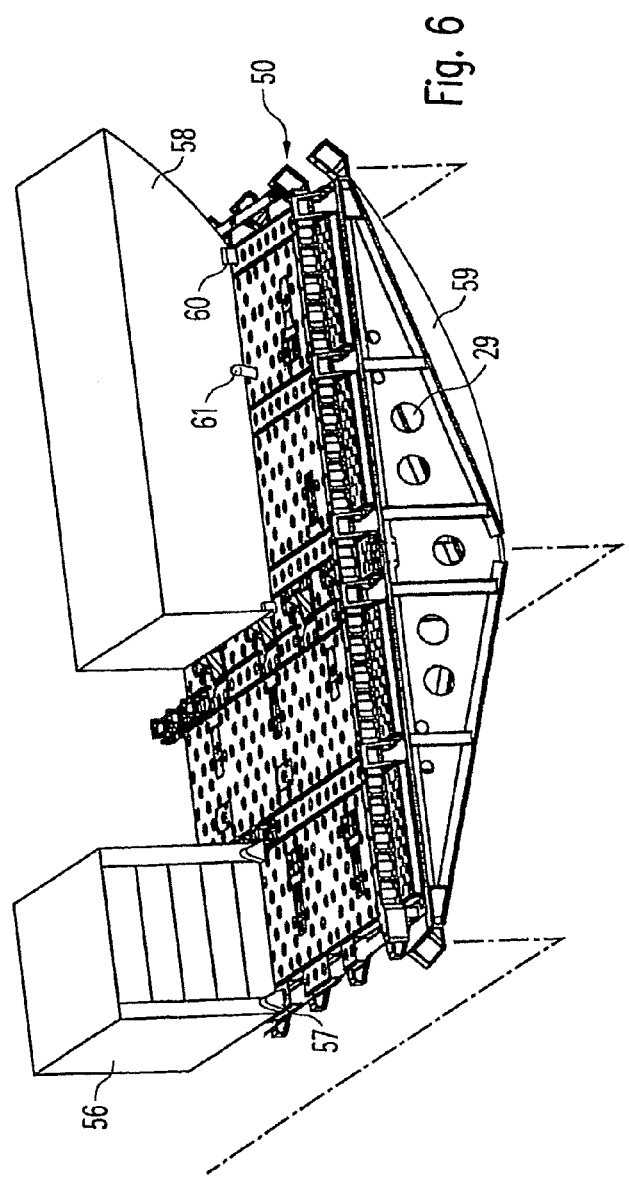
FIG. 6 shows an embodiment of a floor module with tank and EE rack.

FIG. 5 again illustrates the basic appearance of a floor module to which a partition 54 has been fixed. Mounted adjacent to this partition 4, in the embodiment of a floor module 50 shown in FIG. 6, are an EE rack 56 attached by means of fixation devices 57, as well as a water tank 58 with its fixation devices 60 and a waste-water tank 59 with water connection 61. The EE rack contains the electronics ordinarily mounted (behind a partition) in the cargo compartment; thus the major advantage of the embodiment illustrated here is that it is extremely simple to install it in the floor module while the latter is outside the aircraft, so that the risk of errors is reduced. The connections of the EE rack and/or of the electronic components it contains can also be completed outside the aircraft, in which case the electronic components are incorporated into the overall system by way of the conduits and channels described above, as well as the devices for connecting to adjacent modules. It should be pointed out here that this "incorporation" into the overall system naturally also applies to the water tank 58 and the waste-water tank 59, and that such tanks can also serve as extra tanks for fuel. The important thing here is that a simplified assembly outside the aircraft, to form a unitary module which in some cases includes an associated partition 54, is thereby made possible.

The floor modules thus constitute, firstly, "functional subassemblies" that comprise special equipment for transporting and securing freight or electronic components (EE rack) or tanks. On the other hand, the floor modules also constitute "passageways", which serve only to provide a passage for, e.g., air-conditioning conduits 29 (FIG. 6) that has no special direct function in this section of the cargo compartment.

Figure 7:
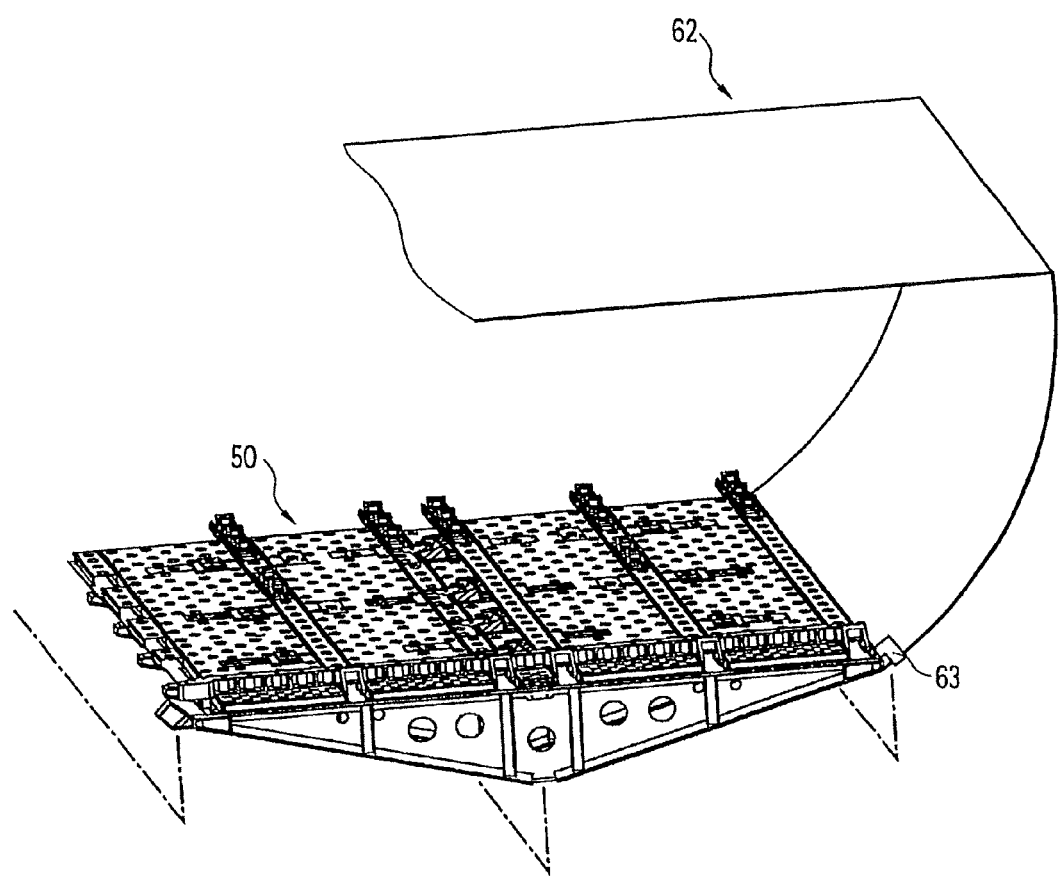
FIG. 7 shows an embodiment of a floor module with wall and ceiling lining.

Furthermore it is also possible, as shown in FIG. 7, to mount lining elements 62 on the floor modules 50 by way of mounting devices 63, in which case preferably additional guide rails or similar guide means are fastened to the outer skin of the aircraft within the cargo compartment in such a way that the floor modules can be transported into the cargo compartment together with the lining elements.

It will be evident from the above that it is an essential basic idea of the invention for the cargo-compartment floor to incorporate its carrying structures and as many as possible of the other functional elements and sections of leads, which must ordinarily be installed separately and subsequently, while the floor is within the aircraft. Such a modular construction not only facilitates the assembly of an aircraft as a whole, but also enhances its quality. Furthermore, various construction methods and materials can be used that could not be employed if the assembly were to be done in the interior of the aircraft fuselage.

The invention claimed is:

1. Method for assembly of a modular floor for a cargo-compartment of an aircraft with a substantially cylindrical fuselage, comprising the following steps:
   providing a floor element;
   providing a floor beam adapted for connection to a skin of the aircraft;
   attaching said floor element to said floor beam such that the floor elements together with the floor beam form a prefabricated floor module that can be handled as a unit;
   lifting said floor module into said cargo compartment into such a position that two opposite lateral ends of said floor beam are in contact with said skin of the aircraft, wherein said two opposite lateral ends of said floor beam are essentially in the same horizontal plane as said floor element, and that a longitudinally bisecting vertical plane which extends through the lower most and upper most portions of said aircraft skin divides said floor beam into two identical halves;
   fastening said floor beam to said skin of the aircraft; and
   repeating said steps until the modular floor of the cargo compartment has been completed.

2. Method according to claim 1, comprising the additional step of mounting a functional unit for a cargo transportation means on the floor element before the latter is lifted into the cargo compartment.

3. Method according to claim 1, wherein a connecting step follows the step of lifting into the cargo compartment in which at least one of
   control devices to control functional units;
   conduction devices such as cable channels, hydraulic conduits, water conduits, electrical leads and similar conduction devices; and
   drainage devices for conducting fluids out of the cargo compartment are connected to corresponding control devices, conducting devices and drainage devices associated with an adjacent floor module that has been fixed within the cargo compartment.

4. Method according to claim 3, wherein at least part of the connecting step is performed prior to the final fixation of the supporting elements to said skin of the aircraft.

5. A partially assembled aircraft, comprising:
   a substantially cylindrical fuselage; and
   a prefabricated lower cargo deck floor module to form at least a portion of a modular lower cargo deck of said aircraft comprising at least one floor element, a functional unit for a cargo transportation means attached to said floor element and at least one floor beam supporting said at least one floor element and adapted for contact to a skin of said aircraft, said floor element being rigidly connected to said at least one floor beam, wherein
   said prefabricated lower cargo deck floor module rests within said substantially cylindrical fuselage with two opposite lateral ends of said prefabricated cargo floor module in contact with said fuselage without said prefabricated cargo floor module being connected to said fuselage such, that a longitudinally bisecting vertical plane which extends through the lower most and upper most portions of said aircraft skin divides said floor beam into two identical halves, wherein said two opposite lateral ends of said prefabricated cargo floor module are essentially in the same horizontal plane as said floor element.

6. Modular floor for a lower cargo compartment of an aircraft with a substantially cylindrical fuselage, comprising:
   at least one floor element;
   a functional unit for a cargo transportation means attached to said floor element; and
   at least one floor beam supporting said at least one floor element and adapted for contact to a skin of the aircraft, wherein said floor beam comprises two opposite lateral ends to support the floor beam and wherein said two opposite lateral ends of said floor beam are essentially in the same horizontal plane as said floor element, said floor element being rigidly connected to said at least one floor beam and thereby forming a prefabricated floor module adapted for installation in the aircraft, wherein said floor module comprises at least one of a water tank and a waste water tank, and wherein said floor beam is symmetrical in respect to a bisecting plane which runs perpendicularly to said floor beam and which segregates said two opposite lateral ends of said floor beam.

7. An aircraft, comprising:
   a substantially cylindrical fuselage; and
   a prefabricated cargo floor module mounted at an ultimate position within said substantially cylindrical fuselage to form at least a portion of a modular lower cargo deck of said aircraft, wherein
   said prefabricated cargo floor module comprises at least one floor element, a functional unit for a cargo transportation means attached to said floor element and at least one floor beam supporting said at least one floor element and adapted for connection to a skin of said aircraft, said floor element being rigidly connected to said at least one floor beam, and
   said substantially cylindrical fuselage and said prefabricated cargo floor module are configured and adapted such that said substantially cylindrical fuselage receives and supports said prefabricated cargo floor module at two opposite lateral ends of said prefabricated cargo floor module substantially at said ultimate position prior to said prefabricated cargo floor module being connected to said fuselage such, that a longitudinally bisecting vertical plane which extends through the lower most and upper most portions of said aircraft skin divides said floor beam into two identical halves, wherein said two opposite lateral ends of said prefabricated cargo floor module are adapted for contact with said skin and are essentially in the same horizontal plane as said floor element.

8. A prefabricated cargo floor module for mounting at an ultimate position within a substantially cylindrical fuselage of an aircraft to form at least a portion of a modular lower cargo deck of said aircraft, comprising:

at least one lower cargo deck floor element;

a functional unit for a cargo transportation means attached to said floor element; and at least one floor beam supporting said at least one floor element and adapted for connection to a skin of said aircraft, wherein said floor element is rigidly connected to said at least one floor beam, and said prefabricated cargo floor module is configured and adapted to be received and supported by said substantially cylindrical fuselage at two opposite lateral ends of said prefabricated cargo floor module substantially at said ultimate position prior to said prefabricated cargo floor module being connected to said fuselage, and wherein said two opposite lateral ends of said prefabricated cargo floor module are adapted for contact with said skin and are essentially in the same horizontal plane as said floor element, said floor beam is symmetrical in respect to a bisecting plane which runs perpendicularly to said floor beam and which segregates said two opposite lateral ends of said floor beam.

\* \* \* \* \*